INVENTORS
JOHN PAUL THORNE
THOMAS J. GEIERMANN
BY THOMAS V. DE AGOSTINO

ATTORNEYS

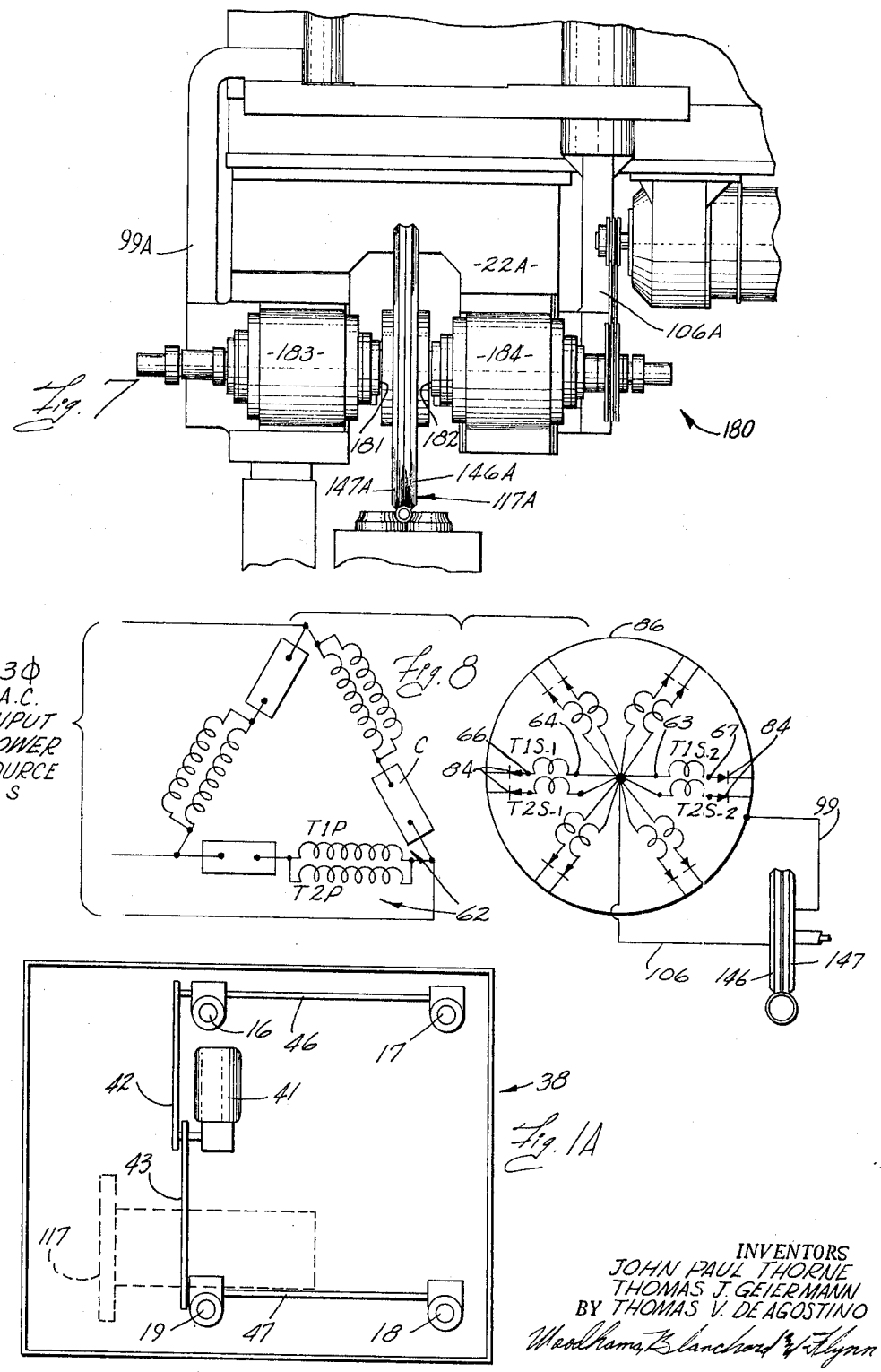

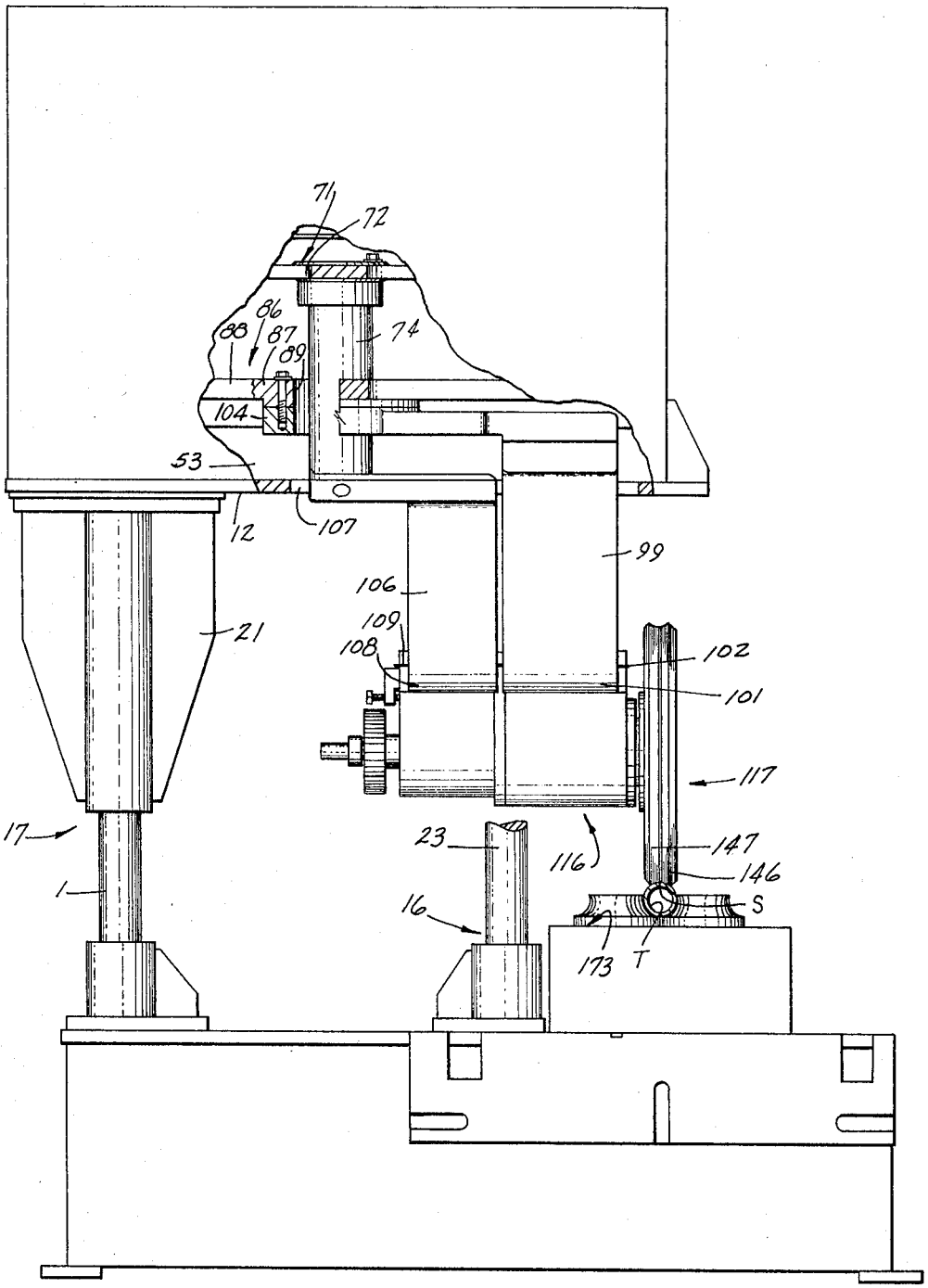

INVENTORS
JOHN PAUL THORNE
THOMAS J. GEIERMANN
BY THOMAS V. DE AGOSTINO

Woodhams, Blanchard and Flynn
ATTORNEYS

INVENTORS
JOHN PAUL THORNE
THOMAS J. GEIERMANN
BY THOMAS V. DE AGOSTINO

Woodhams, Blanchard & Flynn
ATTORNEYS

United States Patent Office 3,283,114
Patented Nov. 1, 1966

3,283,114
DIRECT CURRENT TUBE WELDING MACHINE
John Paul Thorne and Thomas J. Geiermann, Bay City, and Thomas V. De Agostino, Bangor, Mich., assignors to National Electric Welding Machines Co., Bay City, Mich., a corporation of Michigan
Filed Oct. 23, 1965, Ser. No. 503,075
11 Claims. (Cl. 219—59)

This invention relates to a resistance-type tube welding machine and particularly to a type thereof utilizing D.C. power. The invention more particularly relates to such a machine wherein the D.C. power source is mounted fixedly with respect to the axes of the welding rolls.

In the welding of seamed tubing from flat stock, the prior art has utilized both alternating current power sources and direct current power sources. The alternating current power source has been convenient because only a transformer is required to convert the power source from a line source to the voltage and amperage desired in the welding machine. However, for seam welding purposes, especially for tubing, it has been disadvantageous for a number of reasons all of which are well recognized in the art. Some of these disadvantages which may be mentioned to illustrate the problem have included the difficulty of obtaining a continuous seam where the resulting tubing is intended to be fluid tight, the power loss and/or damage to the equipment resulting from inductive effects, including the induction heating of certain parts of the equipment, and the weld spatter which sometimes deposits particles of undesired material on the inside of the tubing.

Referring to the first disadvantage, namely the difficulty of obtaining a continuous seam, it is apparent that where the current is applied in pulses, particularly sine wave pulses as distinguished from square wave pulses, the zones along the seam receiving proper welding current are at appreciable spaced intervals from each other. Sometimes the tubing is run through the welder very slowly to minimize the spacing between these zones, relying upon overlapping of the heating extending both forwardly and rearwardly from adjacent zones of maximum heating to obtain a continuously welded seam. However, this technique severely and undesirably limits the speed of production. Sometimes the same effect is obtained by increasing the frequency of the pulses supplied to the welding electrodes, but this has the disadvantage of increasing the severity of the inductive effects mentioned hereinafter. Sometimes an attempt is made to heat the weld to the maximum possible extent at the peak amplitude points of the sine wave in order to maximize heating ahead and desirable pulse amplitude loss in the current reaching the risk of overheating one portion of the weld seam without eliminating the possibility of underheating another portion thereof.

Referring next to the inductive effects, it is well known that when welding current is supplied from a fixed power source to a rotating shaft carrying the rotating welding electrodes, the frequent polarity reversals of current characteristic of an alternating power supply bring about an induction heating effect concentrated in the bearings on which said shaft is mounted. As a result, the bearings become rapidly overheated and may be rather quickly destroyed. This same overheating also results in an undesirable pulse amplitude loss in the current reaching the welding electrodes.

Referring lastly to the above-mentioned problem of weld splatter, it has frequently been observed that in tubing welded by alternating current, the metal inside the tube at points on the seam corresponding to amplitude peaks of the sinusoidal welding current is overheated sufficiently to cause same to splatter, i.e., to be propelled away from the weld zone in small droplets. The droplets strike and, being molten, affix themselves to the inside surface of the tube opposite said weld zone. This may cause no particular difficulty if the tubing is to be used for conducting liquids, but when the tubing is cut into sections and used for cylinders of a cylinder-and-piston arrangement (such as in automotive shock absorbers), the internal roughness of the cylinder caused by such splatter is at the very least damaging to the piston and will often damage and destroy it very quickly. In the previous practice, elimination of the weld splatters required scarfing the inside of the tube, an expensive operation and not at all satisfactory.

It has long been recognized that the foregoing disadvantages of using an alternating current power supply could be overcome by using a direct current power supply. However, this has, in one form of such power supply, required the use of a motor-generator set which is not only expensive and space consuming but requires continuous operation which was not desirable where sections of material to be welded were passed through the welding machine intermittently. Some attempt has been made in the past to mount transformer-rectifier units directly onto and rotatably with the shaft supporting the rotating electrodes in order to avoid the difficulties of passing large quantities of current through the shaft bearings. However, this requires extremely heavy bearings and a large shaft to enable the large and heavy units required for transformer-rectifier devices to be properly supported and rotated with the said shaft. It also adds considerable weight, and thus inertia, making it more difficult to drive the electrode rolls, which are usually driven from the friction of the tubing being welded.

A still further complication in the design of a tube welding machine arises from the fact that as the electrodes wear and it is necessary to adjust the axis about which they rotate progressively closer to the means supporting the material to be welded. While flexible connectors are possible and have been used, they have the disadvantages, well recognized in the art, of both high maintenance and high resistance characteristics. This is a further reason that the transformer-rectifier unit is in certain present machines mounted directly on the rotating shaft which supports the welding electrodes.

Thus, although the advantages of utilizing the D.C. power source for supplying a tube welder have been recognized, no one to my knowledge has previously devised specific equipment for effectively and efficiently so doing. As set forth above, previous attempts in this direction have been either inefficient, inconvenient or subject to undesirable current limitations and therefore have not enjoyed full commercial acceptance.

Accordingly, the objects of the invention include:

(1) To provide a tube welding machine utilizing D.C. power from an A.C. source, which is both mechanically and electrically effective and practical.

(2) To provide a three-phase full-wave connection with vernier current control in all three phases so that D.C. power having a high ripple frequency (such as 360 cycles per second) and low percentage ripple (such as approximately 4 percent) is supplied to the weld, whereby to obtain high quality welded tubing having a smooth weld upset bead, at high weld speeds.

(3) To provide a resistance welding machine, as aforesaid, wherein the transformer-rectifier, by which the power from the line source is converted to the voltage and amperage to be supplied to the welding electrodes, may be mounted fixedly with respect to the welding electrodes but adjustably with respect to the frame of the machine.

(4) To provide a resistance welding machine, as aforesaid, in which the current is supplied to the electrode supporting shaft through means other than the bearings on which the shaft is mounted.

(5) To provide a welding machine, as aforesaid, in which the only rotating parts are the welding electrodes and relatively short supporting shafts for same so that the bearings supporting said shaft may be relatively small but will still remain effectively operative for a long period of time.

(6) To provide a tube welding machine, as aforesaid, having good visibility for the workman to observe the materials passing through the welding zone and to adjust and/or replace machine components found therein.

(7) To provide a welding machine, as aforesaid, which will be of relatively simple construction and accordingly relatively inexpensive both in its original manufacture and in maintenance.

Other objects and purposes of the invention will be apparent to the persons acquainted with apparatus of this general type upon reading the following specification and examining the accompanying drawings.

In the drawings:

FIGURE 1A is a sectional view substantially as taken on the line IA—IA of FIGURE 1.

FIGURE 2 is a partially broken, rear elevational view of the welding machine of FIGURE 1.

FIGURE 7 is a fragmentary front side elevational view of a modified machine embodying the invention.

FIGURE 8 is a schematic diagram of the electrical circuitry by which power from a three-phase A.C. source is converted to the desired D.C. welding current.

Figure 1:
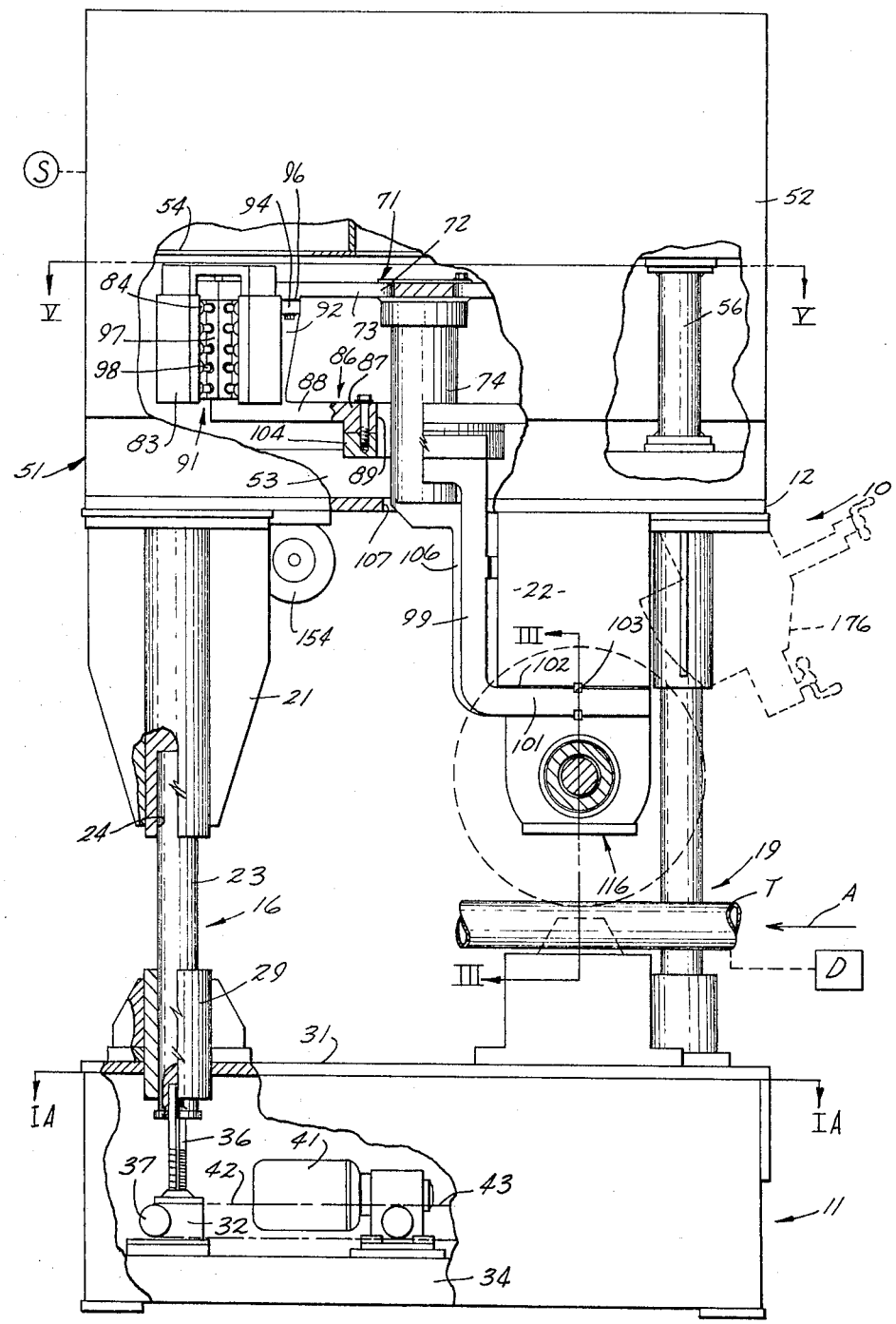
FIGURE 1 is a partially broken, end elevational view of a tube welding machine embodying the invention.
Figure 3:
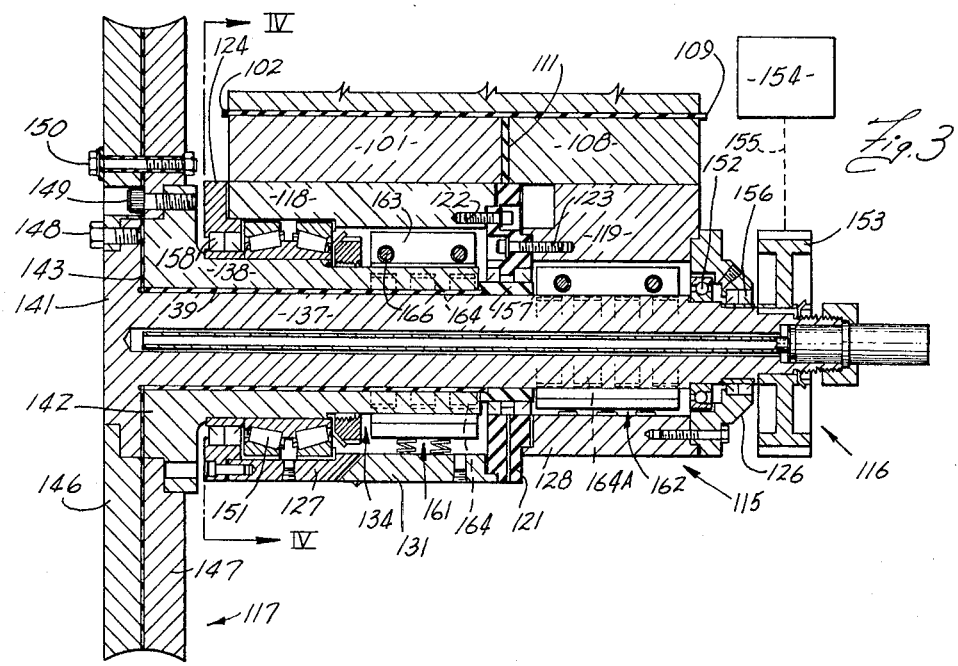
FIGURE 3 is an enlarged section taken on the line III—III of FIGURE 1.
Figure 4:
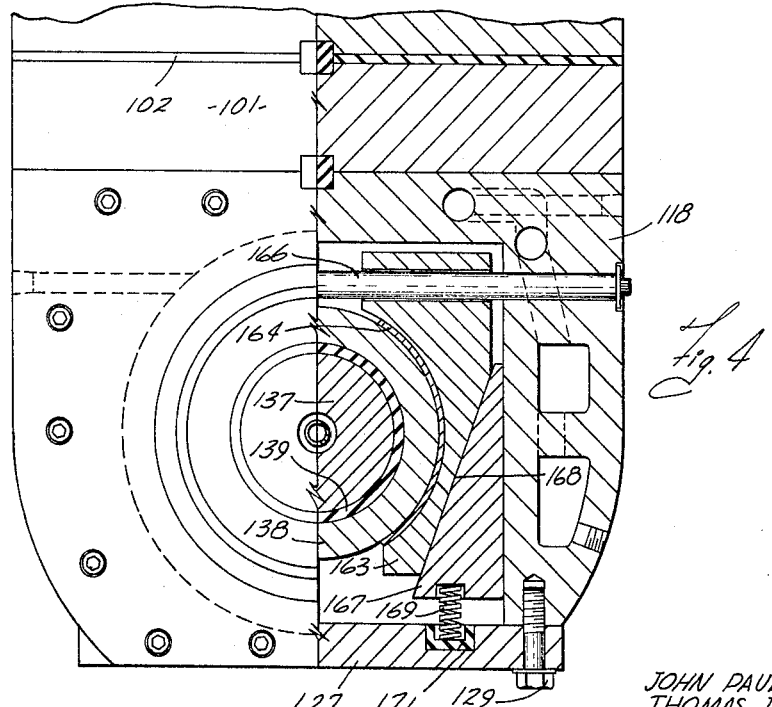
FIGURE 4 is a partially broken sectional view substantially as taken on the line IV—IV of FIGURE 3.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the direction of tubing flow through the device and to the opposite direction, respectively, "forwardly" being toward the left as seen in FIGURE 1. The word "front" will refer to the right side of the machine in FIGURE 1 and the word "rear" will refer to the left side of the machine in FIGURE 1. The words "inwardly" and "outwardly" will refer to directions toward and away from, respectively, the geometric center of the device and designated parts thereof. Said terminology will include the words above specifically mentioned, derivatives thereof and words of similar import.

General description

In general, the apparatus embodying the invention comprises a base structure supporting means for suitably guiding and holding the tube sheet to be welded together with a plurality of upstanding, vertically adjustable supports. A plate is supported on said supports and carries on its upper side the transformer-rectifier unit. Shaft supporting means depend from said plate for rotatably supporting the shafts which in turn support the rotatable welding electrodes. The shafts may be supported either in a so-called straddle arrangement wherein the respective electrodes are supported on shafts extending in opposite directions from each other or in an arrangement wherein said shafts concentrically telescope each other and extend in the same direction from said electrodes. Said shaft supporting means includes both the bearings for rotatably supporting said shafts and fixed shoes axially spaced from said bearings and running against said shafts for supplying electrical power thereto.

Detailed description

Referring first to FIGURES 1 and 2, the welding machine 10 embodying the preferred form of the invention includes a generally rectangular base 11. A mounting plate 12 is spaced above tthe base 11 by a plurality, here four, of spaced supports 16–19 upstanding from the base 11. The supports 16–19 positively prevent relative horizontal movement between the mounting plate 12 and base 11 but are energizable as hereinafter described for moving the plate 12 vertically toward and away from the base 11. In the particular embodiment shown, the upper ends of the supports 16, 17 and 18 comprise preferably identical, downwardly extending pedestals 21 affixed to the underside of the plate 12 adjacent three corners thereof. The upper end of the fourth support 19 terminates in a generally rectangular mounting block 22 affixed to the underside of the plate 12 adjacent the remaining corner thereof. The remaining portions of the supports 16–19 are preferably identical.

Thus, each of the supports 16–19 includes a vertical column 23, the upper end of which is received in a blind recess 24 opening downwardly from the respective one of the pedestals 21 and mounting block 22. The supports 16–19 further include upstanding annular guides 29 which extend through the upper wall 31 of the base 11 for snugly but slideably receiving respective ones of the columns 23 therethrough. Still further, the supports 16–19 each include vertically energizable means, here comprising a conventional screw jack 32, fixed upon a shelf 34 within the base 11. An upstanding screw 36 extends from each jack 32 and is coaxially aligned with the corresponding column 23. The upper end of the screw 36 is fixed to and preferably recessed within the lower end of said column 23. Each of the jacks 32 has an input shaft 37 rotatable to raise or lower the screw 36 and, hence, the column 23 supported thereby.

A positive drive system 38 (FIGURE 1A) is actuable to energize the jacks 32 of all of the supports 16–19 in positive synchronism so as to raise or lower the plate 12 with respect to the base 11 while maintaining the plate 12 parallel with the top 31 of the base 11. In the particular embodiment shown, the drive system 38 comprises a gear motor 41 of a conventional reversible type connected through conventional chain drives 42 and 43 to drive shafts 46 and 47 respectively. The drive shaft 46 connects to the input shaft 37 corresponding to the supports 16 and 17 while the drive shaft 47 connects to the input shafts of the supports 18 and 19.

Figure 5:
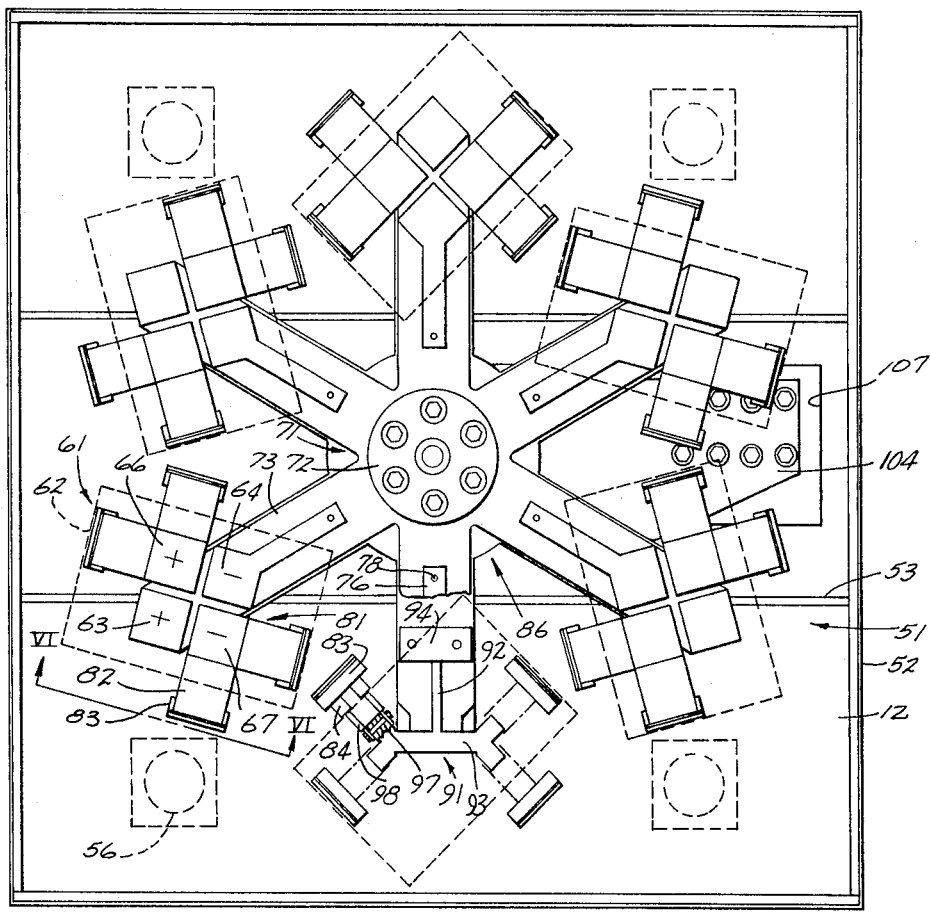
FIGURE 5 is a partially broken sectional view substantially as taken on the line V—V of FIGURE 1.
Figure 6:
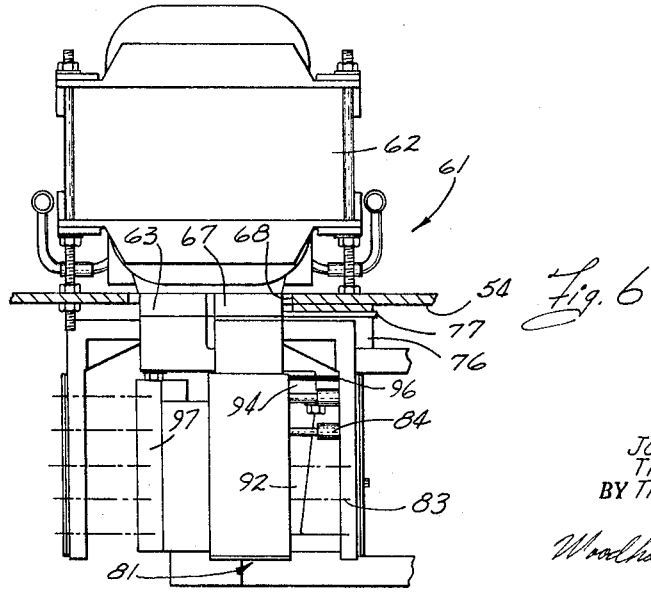
FIGURE 6 is a sectional view substantially as taken on the line VI—VI of FIGURE 5.

The machine 10 includes a power supply generally indicated at 51 (FIGURES 1 and 5) which is supported upon and fixed with respect to the mounting plate 12 for supplying D.C. welding current. The power supply 51 includes a generally rectangular housing 52. The housing 52 comprises a stiffening grid work of members running transversely across the plate 12 as indicated at 53. A horizontal shelf 54 (FIGURES 1 and 6) is spaced between the plate 12 and at the top of the housing 52 for separating the housing into upper and lower chambers. The shelf 54 is supported upon the plate 12 by a plurality, here four, of columns located adjacent the corners thereof as indicated at 56.

The power supply 51 includes a plurality, here six, of substantially identical transformer-rectifier assemblies 61 (FIGURES 5, 6 and 8) which in the particular embodiment shown broadly correspond to transformer-rectifier assemblies disclosed in copending application Serial No. 420,949, assigned to the assignee of the present invention. The transformer-rectifier assemblies 61 are preferably evenly spaced and arranged in a circle about the center of the housing 52 or may be arranged symmetrically around a horizontal axis as described in patent application No. 420,949. Each assembly 61 includes a transformer 62 which is mounted upon and above the shelf 54 and in series with a suitable current control unit C of any convenient type, such a tube contactor with phase shift means or a saturable reactor. Each transformer 62 has, in this embodiment, a primary winding, two secondary windings and output terminal blocks 63, 64, 66 and 67 arranged as diagonally opposed pairs on the ends of said secondary windings. The primary windings of two transformers are indicated at T1P and T2P and their corresponding secondary windings are indicated at T1S–1, T1S–2 and T2S–1, T2S–2, respectively. Thus, the blocks 63 and 64 are electrically energized in opposite polarity by secondary windings T1S–1 and T1S–2 and the blocks 66 and 67 are electrically energized in opposite polarity. Their instantaneous polarities are as shown on the blocks 63, 64, 66 and 67 in FIGURE 5. The diagonal pair 63 and 64 is preferably aligned substantially radially of the center of the housing 52. The terminal blocks 63, 64, 66 and 67 depend from the transformer 62 through an opening 68 in the shelf 54.

A generally star-shaped common or reference conductor 71 is centered within the circle of transformer-rectifier units 61 and has a hub portion 72 from which radiate evenly spaced, preferably substantially identical arms 73. The star-shaped conductor 71 is spaced at a short distance below the shelf 54 and each of the arms 73 thereof is attached at its outer end to the undersides of the terminal blocks 63 and 64 of a corresponding one of the transformers 62. Thus, the blocks 63 and 64 are held at a common reference potential by connection to the arm 73 so that the secondary winding ends terminating in the blocks 66 and 67 will have peak potentials of opposite phase above and below the reference potential on the arm 73. In this manner, all of the transformers 62 are connected to the common conductor 71. A central conductor 74 is secured to and depends from the hub 72 of the central star-shaped conductor 71.

The transformer-rectifier units 61 further include preferably identical rectifier carriers 81 secured to and depending from each of the terminal blocks 66 and 67. The rectifier carriers 81 each comprise a horizontal, 90° V-shaped upper flange, the apex portion of which is fixed by any convenient means such as screws, not shown, to the underside of the corresponding one of the potential supply blocks 66 and 67. The free ends of the V-shaped flange 82 extend away from the arm 73 and carry integral, depending and preferably identical rectifier mounting plates 83 which are disposed at right angles to each other and to the V-shaped flange 82. Each of the plates 83 carries one end of a plurality of solid state rectifiers, suitably arranged as desired, in this embodiment, semi-conductor (such as silicon) rectifiers, arranged in double vertical rows. The rectifiers 84 extend perpendicularly from the plates 83 toward a zone beneath the apex of the V-shaped flange 82.

The power supply 51 further includes a second star-shaped conductor 86 spaced coaxially below the upper star-shaped conductor 71. The lower star-shaped conductor 86 has a central hub 87 and a plurality, here six, of arms 88 which extend parallel with and beneath corresponding ones of the upper arms 73 at about the height of the bottom of the rectifier plates 83. The hub 87 is provided with a central opening 89 through which the depending central reference conductor 74 loosely extends.

A conductive bracket 91 is fixed to and extends upwardly from the end of each of the arms 88. The bracket 91 is generally of T-shaped horizontal section having a vertical flange 92 centered on the arm 88 and extending longitudinally thereof and a further upstanding flange 93 which extends transversely of the arm 88 at the outer end thereof. The transverse upstanding flange 93 is centered and spaced beneath the opposed apexes of the V-shaped flanges 82 connected to the terminal blocks 66 and 67. The upper inner corner of the longitudinal flange 92 is surmounted by an integral crosspiece 94 which is secured through an insulative connection generally indicated at 96 to the underside of the corresponding leg 73 located thereabove. Thus, the outer ends of the legs 88 are pendently supported by the bracket 91 from the legs 73 of the upper star-shaped conductor 71 through an electrically isolated connection. The vertically extending ends of the transverse flange 93 are split to form two generally rectangular upstanding ribs 97 each of which is opposed to and spaced from the center of a corresponding one of the rectifier plates 83. The free ends 98 of the rectifiers 84 are conductively connected to the corresponding ribs 97, each rib 97 being snugly disposed between the two rows of rectifiers extending from the opposed plate 83. As a result, the transformer output terminal blocks 66 and 67 of each transformer 62 connect independently to a leg 88 of the lower star-shaped conductor 86 through individual sets of rectifiers 84. Thus, one such set of rectifiers is arranged to conduct when the terminal block 66 is positive with respect to the common conductor 71 and the other set of rectifiers is arranged to conduct when the terminal block 67 is positive with respect to the common conductor 71, so as to energize each arm 88, relative to the common conductor 71, with a full-wave rectified potential.

The concentric arrangement of transformers and rectifiers as above described serves to obtain electrical balance of impedances, and thus of current wave form.

The preferred embodiment shown is particularly adapted for energization by a three-phase electrical power source indicated generally at S. For example, the primary windings of one diagonally opposed pair of the transformers 62 are preferably fed with one phase of such three-phase source, a second diagonally spaced pair of transformers 62 is preferably fed with the second phase of the three-phase source and the remaining diagonal pair of transformers 62 is preferably fed with the remaining phase of the three-phase source, said phases being phase shifted by the conventional 120°. With this arrangement, it will be apparent that the current supplied by the transformer-rectifier units 61 to the lower conductor 86 will be comprised of a relatively large amplitude D.C. component having a relatively small amplitude ripple current superimposed thereon, the ripple current having a frequency six times that of the three-phase power line supplying the machine 10 (that is, for a sixty cycle source the ripple current frequency would be 260 cycles per second).

A conductive bus bar 104 (FIGURES 1, 2 and 5) is connected at one end thereof to and beneath the hub 87 of the lower star-shaped conductor 86 and extends radially therefrom along and above the inner or leftward FIGURE 1) side of the mounting block 22. As seen in FIGURES 1 and 2, the upper end of a generally Z-shaped bus bar 99 extends through an elongated opening 107, in the plate 12 and is connected to and beneath the outer end of the bus 104. The bus 99 extends downwardly along and is electrically isolated from the rearward side of the mounting block 22. A horizontal flange 101 extends from the lower end of the Z-shaped bus bar 99 beneath the mounting block 22 and is electrically isolated therefrom by a layer of insulation 102. An insulative key 103 prevents relative transverse motion between the bus 99 and mounting block 22.

One end of a reference bus bar 106 is disposed in the opening 107 in the plate 12 and is electrically connected to the lower end of the central conductor 74. The reference bus bar 106 extends horizontally along the opening 107 to a location spaced from the bus 99 and then drops to parallel the bus 99 along the rear face of the mounting block 22 while remaining electrically isolated from the mounting block 22 and bus 99. The bus bar 106 has a horizontal flange 108 at its lower end which extends beneath the mounting block 22 and is isolated therefrom by suitable insulation 109 and from the lower flange 101 of the bus 99 by further insulation 111 (FIG- URE 3). A suitable insulative key, not shown, similar to the above-described key 103 may be used to prevent lateral movement of the flange 108 with respect to the mounting block 22.

A wheel head 116 (FIGURES 1, 2, 3 and 4) is pendently supported by the mounting block 22 by any convenient means not shown, the wheel head 116 being separated from the mounting block 22 by the flanges 101 and 108 of the aforementioned Z-shaped bus bars 99 and 106. The wheel head 116 rotatably supports a welding wheel 117. The bus bars 99 and 106 supply welding current through the head 116 to the wheel 117 as hereinafter described in detail.

The wheel head 116 comprises a shaft housing 115 (FIGURE 3) including a spaced coaxial pair of generally U-shaped downwardly opening sections 118 and 119. The bight portions of the sections 118 and 119 electrically engage and are fixed to the flanges 101 and 108, respectively, of the bus bars 99 and 106 by any convenient means such as screws, not shown. The housing sections 118 and 119 are constructed of an electrically conductive material. The sections 118 and 119 are separated by a radially extending intermediate plate 121 of electrically insulative material secured thereto by screws generally indicated at 122 and 123, respectively. The free axial end of the section 118 is closed by an end plate 124. The free axial end of the section 119 is closed by an end plate 126 secured thereto by any convenient means such as screws not shown. The open bottom faces of the sections 118 and 119 are closed by covers 127 and 128, respectively, which are secured to the sections 118 and 119 preferably by screws 129. The drive side cover 128 and a portion 131 at the drive end of the wheel side cover 127 are preferably removable for purposes appearing hereinafter.

A wheel shaft 134 extends axially of the housing 115 and comprises a central core 137 extending through the ends of the housing 115 and a sleeve 138 which extends leftwardly from the insulative intermediate plate 121 out of the end of the housing. The sleeve 138 and core 137 are electrically isolated by an insulative layer 139 disposed therebetween. The core 137 and sleeve 138 have radially extending flanges 141 and 142, preferably integral with the leftward ends thereof, which are axially separated by a radial layer of insulation 143. The flanges 141 and 142 carry radially extending annular wheel discs 146 and 147, respectively, secured thereto by any convenient means such as screws 148 and 149, respectively, the discs 146 and 147 being separated by radial extension of the radial insulative material 143 above described. The discs 146 and 147 are here fixed together by insulated bolts 150 extending therethrough, the discs 146 and 147 together with the hubs upon which they are supported forming the afore-mentioned wheel generally indicated at 117.

If desired, the current conductors including the wheel shaft, bus bars, star-shaped conductors, rectifier carriers and so forth may be cooled, as by liquid cooling means, in any conventional manner.

A bearing 151 is located at the leftward end of the housing section 118 and snugly surrounds the sleeve 138 to support the leftward end of the shaft 134 for rotation. A bearing 152 housed within the drive end plate 126 and engaging the core 137 supports the rightward end of the shaft 134 for rotation. The rightward or drive end of the shaft 134 has affixed thereto a sprocket 153 by which the shaft 134 may be rotatably driven by a suitable motor of any convenient type schematically indicated at 154 through any conventional drive 155. The motor 154 is preferably mounted on the underside of the plate 12.

Suitable seals 156, 157 and 158 are carried by the plates 126, 121 and 124, respectively, to prevent leakage of lubricant along the shaft. It should be noted that at least the intermediate seal 157 is of electrically insulative construction so as not to provide a current path between the core 137 and sleeve 138.

Conductive shoe assemblies 161 and 162 are provided within the housing sections 118 and 119, respectively, adjacent the intermediate plate 121 for applying current from the sections 118 and 119 to the sleeve 138 and core 137, respectively, and thence to the discs 147 and 146, respectively. The shoe assembly 161 (FIGURES 3 and 4) comprises a pair of semicircular members one of which is indicated at 163. Each member 163 supports a plurality, here three, of axially spaced, curved contact shoes 164 which normally bear snugly against the periphery of the sleeve 134. The semicircular members 163 are opposed to each other and located on opposite sides of the shaft 134. The members 163 are carried for transverse movement with respect to the shaft 138 by an axially spaced pair of transverse rods 166 located above the shaft 134 and secured at their outer ends to the depending wall of the housing section 118. An upwardly tapering wedge 167 is inserted between each of the semicircular members 163 and the adjacent depending wall of the housing section 118 and bears against a correspondingly sloped surface 168 on the semicircular member. The wedges 167 are urged upwardly with respect to the section 118 by suitable springs 169 received in insulative sockets 171 in the cover 127 so as to continuously urge the shoes 164 against the periphery of the sleeve 138. Welding current is thus carried from the housing section 118 through the wedges 167, semicircular members 163 and shoes 164 to the sleeve 138 and thence to the wheel disc 147.

The shoe assembly 162 is substantially similar to the shoe assembly 161 except, in the present embodiment, for utilizing an additional shoe, here indicated in broken lines at 164A, and being shaped to conform to the lesser radius of the core 137. Hence, no further description of the shoe assembly 162 is believed necessary. The shoe assembly 162 carries welding current in the same way as the assembly 161 above described, so that current is conducted from the depending walls of the section 119 through the parts of the shoe assembly 162 to the core 137 and thence to the wheel disc 146. Further details of this type of current transfer means appear in U.S. patent to Fisher and Ward No. 3,176,254.

A guiding device generally indicated at 173 which may be of any conventional construction is supported atop the base 11 for guiding the tube T beneath the wheel 117 and to assure that the axially extending edge portions of the tube T which are to be welded to form the seam S are disposed snugly together as the tubing passes beneath the welding wheel 119. The tube guiding device 173 holds the tube T firmly against the wheel 117 for welding as the tube moves therebeneath. The tube T is preferably driven axially through the machine 10 by any convenient and conventional drive means indicated at D. Normally, as is customary in tube welding machines, the friction of the tube being propelled under the welding rolls will effect rotation of such rolls and the motor 154 either idles or is disconnected. If desired, however, as it may be for very small tubing, the motor 154 may be energized for driving the welding electrodes and in such case will need to be synchronized with the tubing drive D. If desired, and it normally will be desired, a wheel dressing device of any conventional type, indicated in broken lines at 176 in FIGURE 1, may be provided for dressing the periphery of the wheel 117 and for contouring same to conform to the periphery of tubes T of various cross sections. Where such is used, the motor 154 will drive the electrodes for dressing purposes.

*Operation*

Although the operation of the machine 10 embodying the invention has been indicated somewhat above, it will now be summarized to insure a complete understanding of the invention.

Prior to the initiation of welding, the wheel 117 may be dressed using the dressing device 176, if required, to make the periphery of the wheel conform in shape to the tube T which is to be welded with rotary power for such dressing supplied by motor 154.

The vertical position of the wheel 117 may be adjusted so that it will firmly bear on the tube T to be welded while allowing the tube T to be moved therepast through the machine 10. The wheel 117 is raised by raising the plate 12 from which it is pendently supported. Raising of the plate 12 is accomplished upon energization of the gear motor 41 in the appropriate direction by the machine operator. The gear motor 41 drives the jacks 32 of the supports 16–19 in positive synchronism through the chain drives 42 and 43 and shafts 46 and 47 to raise the screws 36 thereof. The screws 36 rise simultaneously and at the same rate of speed thereby lifting the columns 23 associated therewith in a corresponding fashion. The plate 12 together with a power supply 51 and wheel 117 are lifted by the columns 23. Reversal of the gear motor 41 lowers the platform 12 and wheel 117.

The tubing T is preferably fed along the guide 173 with the upturned seam S thereof centered beneath the insulated central portion 143 of the wheel 117, the portion of the tube T on one side of the seam S contacting the wheel disc 146 and the portion of the tube T on the other side of the seam S contacting the other wheel disc 147.

The motor 154 may rotate the welding wheel 117 so that its lower edge moves the same direction as the tubing T. The peripheral speed of the wheel and the axial speed of the tubing are preferably substantially the same so that the wheel rolls rather than slides on the tube T. The operator may, through any convenient switch means, not shown, energize the primary windings of the transformer 62 preferably from a three-phase alternating current line as above described. Using a three-phase input, each of the three phases is fed to the appropriate transformers, here the two transformers 62, preferably diagonally opposed ones thereof. The transformers 62 are normally of the voltage step-down type capable of yielding a high current at a relatively low alternating voltage across their secondary windings as a result of a high voltage on their primary winding.

Welding current flows from the ends of the transformer secondary windings through the terminal blocks 66 and 67 and into respective ones of the rectifier carriers 81 fixed to such terminal blocks. The voltage applied to the terminal blocks 66 and 67 is alternating and of opposite phase. Thus, the rectifiers 84 associated with the terminal block 66 will conduct on one half-cycle of the alternating voltage signal while the rectifiers 84 associated with the other terminal block 67 will conduct on the opposite half-cycle.

The rectifiers are all arranged so that one electrode, e.g., the anodes thereof, are all connected to the carrier 81 while the other electrode, e.g., the cathodes thereof, are all connected to the ribs 97 of the conductive brackets 91. Thus, successive current half-waves of identical polarity, e.g., positive with respect to the upper star-shaped conductor 71, will be applied to each bracket 91 by the rectifiers 84, the rectifiers of each transformer 62 acting in concert as a full-wave rectifier. Thus, when a three-phase source is split to drive the transformers 62, the three different full-wave currents with the same polarity and defining in phase by 120° will flow through the lower star-shaped conductor 89. This current is D.C. with only a relatively small amplitude ripple content. This current passes through the hub of the lower star-shaped conductor 86 and the radially extending bus 104 to the bus bar 99. Welding current then passes through the horizontal flange 101 to the U-shaped housing section 118 of the wheel housing 116 and then through the wedges 167, semicircular members 163 and shoes 164 into the sleeve 138 rotatable therewithin and thence through the flange 142 to the wheel disc 147 of the wheel 117 and into the tube T at one side of the seam S. Current then flows across the abutting surfaces of the seam S to weld same in a well-understood manner. The weld current returns to the transformers 62 through the wheel disc 146, core 137, shoe assembly 162, housing section 119, bus 106 and the conductors 74 and 71.

*Modification*

The modified machine 180 of FIGURE 7 differs from the machine 10 of FIGURE 1 in that a so-called straddle type wheel 117A is employed thereby rather than the overhung wheel 117 of the machine 10. The machine 180 is otherwise generally similar to the machine 10 and parts thereof corresponding to parts of the machine 10 will be referred to by the same reference numerals there as with the suffix "A" added thereto. More particularly, the disc electrodes 146A and 147A of the straddle-type wheel 117A are supported on spaced, coaxial and oppositely extending shafts 181 and 182 which in turn are supported in shaft housings 183 and 184 respectively. The shaft housings 183 and 184 are each preferably substantially similar to the wheel housing 116 above discussed but require for each thereof only one shoe assembly and, hence, are without a shoe assembly corresponding to the shoe assembly 161. Further, current is supplied each shaft housing from only one conductive bus bar. More particularly, the housing 183 is supplied current through a bus 99A and the housing 184 through bus 106A.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. In a tube welding machine, the combination comprising:
   a base;
   a plate vertically spaced above said base and means mounting said plate on and adjustably with respect to said base;
   guide means on said base for guiding material to be welded therethrough;
   a pair of shafts spaced below said plate and means including bearing means pendently and rotatably supporting said shafts from said plate;
   circular welding electrodes on each of said shafts positioned for cooperation with said guide means to effect a desired operation;
   direct current power source means fixedly supported on said plate, said plate being interposed between said power source means and said bearing means, and means independent of said bearing means for connecting the respective output terminals of said power source means with each of said shafts;
   whereby a D.C. potential is supplied between said welding electrodes without restricting vertical adjustability thereof.

2. The device defined in claim 1 wherein said power source means comprises a transformer and a solid state rectifier connected to the secondary winding of said transformer and to said shaft connected means.

3. The device defined in claim 1 wherein said shafts extend from said electrodes in opposite directions with respect to each other and said shaft support means and said power source connected means are correspondingly placed on opposite sides of said welding electrodes, said power source connected means being fixed with respect to said power source.

4. The device defined in claim 1 wherein said shafts are at least in part concentric with each other, said power source connected means comprises bus bars extending downwardly beside said shaft supporting means and said shaft support means are placed on only one side of said welding electrodes.

5. The device defined in claim 1 wherein said pendent means include contact shoe means axially spaced from said bearing means and in constant contact with respective ones of said shafts and still further include insulative means between said shoe means and said bearing means whereby electrical current is conducted to said respective shafts through said shoe means and is prevented from passing through said bearings.

6. In a tube welding machine, the combination comprising:
   a base having a generally horizontal upper surface;
   a plurality of posts upstanding from said base and a plate supported at the upper ends of said posts in a generally horizontal position, said posts being vertically movable for vertical adjustment of said plate, said base including lifting means therein for effecting and controlling vertical movement of said posts;
   guide means on said base for guiding material to be welded into tubular shape;
   a pair of shafts spaced below said plate and means including bearing means rotatably supporting said shafts from said plate;
   circular welding electrodes on each of said shafts positioned for cooperation with said guide means to effect the desired welding operation;
   a pair of spiders positioned in spaced relationship to each other on and above said plate and a plurality of transformer-rectifier units also supported on and above said plate, the outputs of said transformer-rectifier units of one polarity being connected to one of said spiders and the outputs thereof of the opposite polarity being connected to the other of said spiders, means for supplying multiphase alternating potential to said transformer-rectifier units and means including rigid bus means independently connecting each of said spiders with each of said shafts;
   whereby a D.C. potential is applied between welding electrodes without restricting the vertical adjustability thereof.

7. The device defined in claim 6 wherein said lifting means comprises a plurality of screw jacks disposed in one to one correspondence with and under each post for lifting same and further comprises synchronized rotative driving elements linking said screw jacks for providing equal and simultaneous operation of said jacks.

8. The device defined in claim 6 wherein said spiders are each positioned in a generally horizontal plane and one is superposed above the other, wherein the uppermost of said spiders includes a central post extending through a central opening in the lower of said spiders and wherein one of said bus bars is connected to one spider through said central post and the other of said bus bars is connected to the other of said spiders at a point adjacent said central opening, whereby both of said bus bars are energized at points respectively adjacent the centers of said respective spiders.

9. The device of claim 6 in which the transformer-rectifier units connected to each input phase are arranged symmetrically about a center and the outputs of each of said units are also arranged substantially symmetrically with respect to said units, whereby the electrical impedances and therefore the electrical currents from each phase will be substantially balanced with respect to each other.

10. The device defined in claim 2 in which said shaft supporting means comprise a block fixed to said plate and extending downwardly therefrom and pendently supporting said bearing means and in which said shaft connected means include a pair of conductive bus bars interposed between said bearing means and said mounting block and insulated from said bearing means for supplying direct electric current to said shafts.

11. The device defined in claim 1 including a shelf supported in fixed relation to and above said plate; and in which
   said power source means comprises a plurality of transformers supported fixedly upon said shelf and a plurality of rectifier sets disposed between said shelf and plate below corresponding ones of said transformers and fed by the secondary windings of said transformers, said power source means further including rigid conductor means supporting said rectifier sets and connected in circuit with said rectifier sets and transformer means for supplying direct current to said shaft connected means.

References Cited by the Examiner
UNITED STATES PATENTS

| | | | |
|---|---|---|---|
| 1,954,679 | 4/1934 | Winfield | 219—59 |
| 2,293,846 | 8/1942 | Nichols | 219—59 |

RICHARD M. WOOD, *Primary Examiner.*